United States Patent [19]

Knohl

[11] Patent Number: 5,328,311
[45] Date of Patent: Jul. 12, 1994

[54] FASTENER ASSEMBLY WITH AXIALLY SLIDABLE SLEEVE AND FLOATING RETAINER

[75] Inventor: Rudolph E. Knohl, Bartlett, Ill.
[73] Assignee: Elco Industries, Inc., Rockford, Ill.
[21] Appl. No.: 114,319
[22] Filed: Aug. 30, 1993

Related U.S. Application Data

[63] Continuation-in-part of Ser. No. 952,594, Sep. 28, 1992, Pat. No. 5,244,325.

[51] Int. Cl.⁵ .................... F16B 21/18; F16B 39/00
[52] U.S. Cl. .................... 411/353; 411/107; 411/970; 411/999
[58] Field of Search ............ 411/105, 107, 109, 352, 411/353, 533, 970, 999, 337; 403/408.1

[56] References Cited

U.S. PATENT DOCUMENTS

| | | | |
|---|---|---|---|
| 1,970,078 | 8/1934 | Dillon | 411/107 X |
| 3,138,188 | 6/1964 | Tuozzo et al. | 411/999 X |
| 3,204,680 | 9/1965 | Barry | 411/999 X |
| 3,221,794 | 12/1965 | Acres | 411/353 |
| 3,465,803 | 9/1969 | Ernest et a. | 411/999 X |
| 4,238,165 | 12/1980 | Wagner | 403/408.1 |
| 4,732,519 | 3/1988 | Wagner | 403/408.1 |
| 4,975,008 | 12/1990 | Wagner | 411/337 |
| 5,040,917 | 8/1991 | Camuffo | 411/353 X |
| 5,098,241 | 3/1992 | Aldridge et al. | 411/353 X |

Primary Examiner—Neill R. Wilson
Attorney, Agent, or Firm—Leydig, Voit & Mayer

[57] ABSTRACT

A sleeve is slidable axially through a limited range along the shank of a threaded fastener. A resiliently yieldable retainer is capable of both moving with and moving along the thread of the shank and captivates the sleeve against slipping axially off of the shank while effecting required relative positioning of the sleeve and the shank even if the sleeve is short in comparison to the length of the shank.

6 Claims, 2 Drawing Sheets

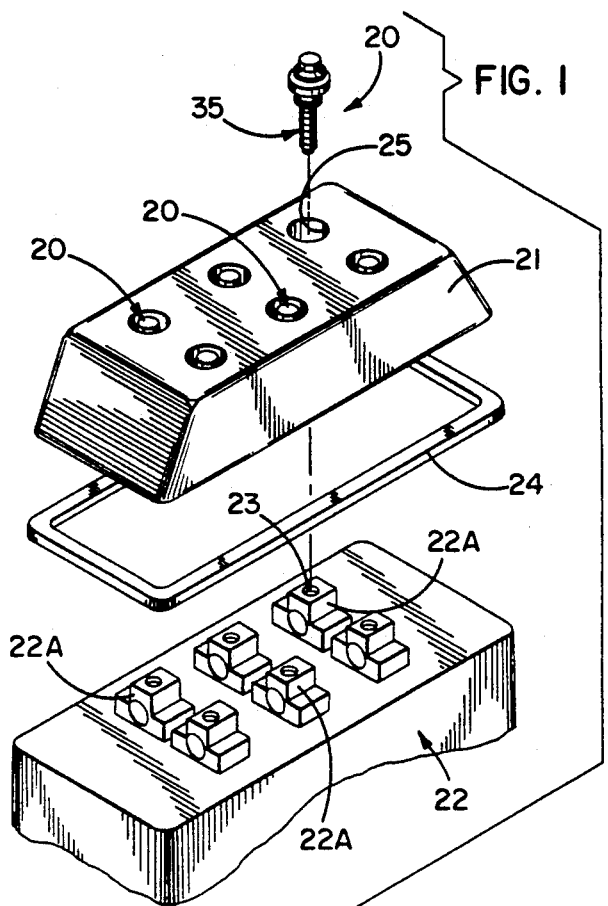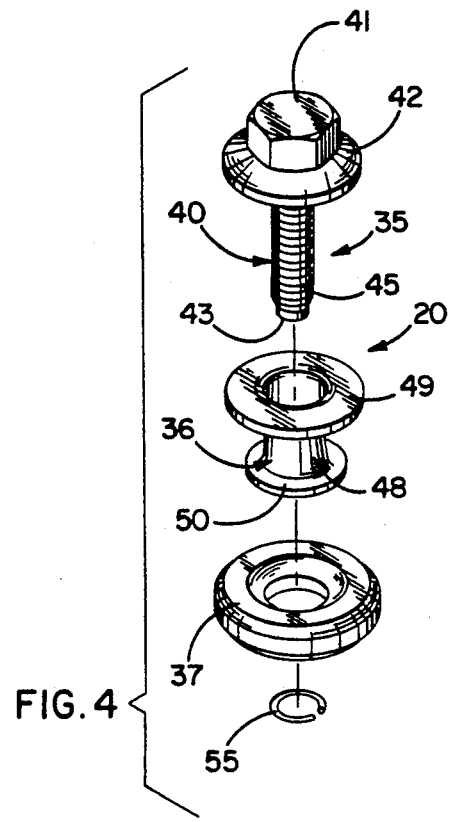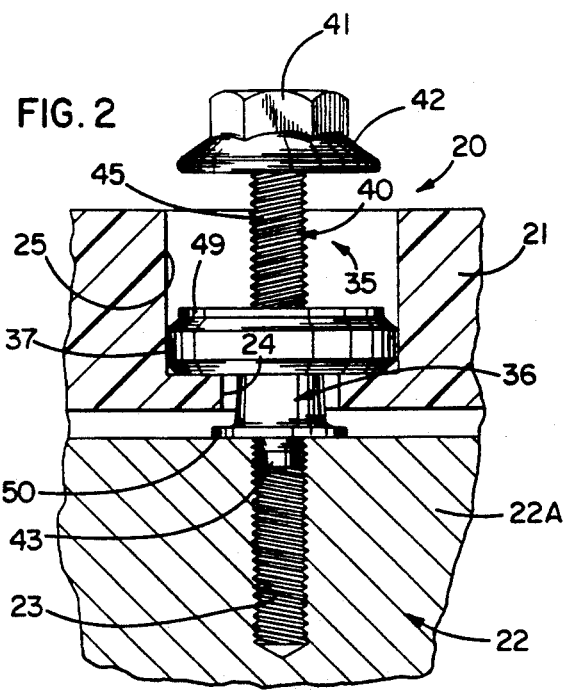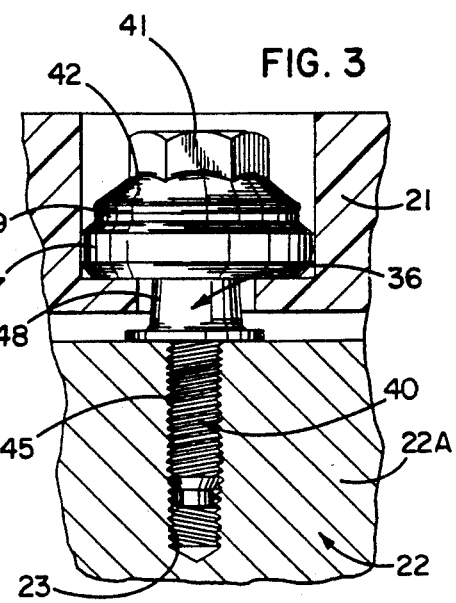

FASTENER ASSEMBLY WITH AXIALLY SLIDABLE SLEEVE AND FLOATING RETAINER

CROSS-REFERENCE TO A RELATED APPLICATION

This application is a continuation-in-part of my copending application Ser. No. 07/952,594, filed Sep. 28, 1992, now U.S. Pat. No. 5,244,325, issued Sep. 14, 1993.

BACKGROUND OF THE INVENTION

This invention relates generally to a threaded fastener assembly and, more particularly, to a fastener assembly of the type in which a sleeve is adapted to be preassembled with and captivated axially on the shank of a threaded fastener. Even more specifically, the invention relates to a special-use fastener assembly of the type in which the sleeve must be capable of moving axially along the shank through a limited range.

A fastener assembly of this general type is disclosed in my aforementioned copending application. In that assembly, the shank of the fastener is formed with a lower threaded section and an unthreaded upper section, there being an axially facing shoulder defined at the junction between the two sections. A resiliently yieldable retainer grips the unthreaded section of the shank and engages the shoulder. The interior of the sleeve is shaped and dimensioned to permit the sleeve to be slipped onto the shank and, after the retainer has been installed, to enable the sleeve to slide axially through a limited range on the shank while being captivated thereon by the coaction of the retainer and the shoulder.

In certain applications of the fastener assembly, it is a requirement that fully formed threads on the fastener at least reach the bottom of the sleeve and preferably extend up into the sleeve when the fastener assembly is in its fully installed position. It also is a requirement that the fastener be capable of sliding upwardly relative to the sleeve to a point where all of the threads are located inside of the sleeve. The fastener assembly disclosed in my aforementioned application can meet these requirements as long as the length of the sleeve is greater than one-half the length of the fastener shank but cannot satisfy these criteria if the length of the sleeve is less than one-half the length of the shank.

SUMMARY OF THE INVENTION

The general aim of the present invention to provide a fastener assembly of the above general type having a uniquely located retainer which enables the requirements specified above to be met regardless of whether the length of the sleeve is greater or less than one-half the length of the fastener shank.

A more detailed object is to achieve the foregoing by locating the retainer on the threaded section of the fastener shank and by allowing the retainer to first move with the thread and then to move along the thread during installation and removal of the fastener. In this way, the retainer may be positioned to enable the necessary criteria to be satisfied even if the length of the sleeve is less than one-half the length of the fastener shank.

These and other objects and advantages of the invention will become more apparent from the following detailed description when taken in conjunction with the accompanying drawings.

BRIEF DESCRIPTION OF THE DRAWINGS

FIG. 1 is an exploded perspective view showing unique fastener assemblies of the present invention securing a rocker arm cover to an engine block.

FIG. 2 is an enlarged elevational view, partly in section, and shows a fastener assembly in a pre-installed position just prior to attachment of the rocker arm cover to the engine block.

FIG. 3 is a view similar to FIG. 2 but shows the fastener assembly in a fully installed position after attachment of the cover to the block.

FIG. 4 is an exploded perspective view of the components of the fastener assembly.

DETAILED DESCRIPTION OF THE PREFERRED EMBODIMENT

Figure 5:
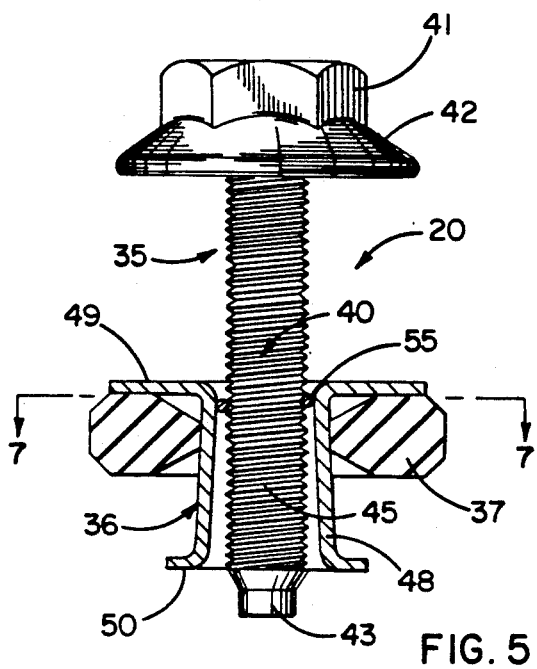
FIGS. 5 and 6 are enlarged views of the fastener assembly in the positions shown in FIGS. 2 and 3, respectively, portions of the fastener assembly being broken away and shown in section.

For purposes of illustration, the invention has been shown in the drawings as incorporated in a threaded fastener assembly 20, there being a plurality of such assemblies shown in FIG. 1. In the specific application shown in FIG. 1, the fastener assemblies are used to secure a plastic rocker arm cover 21 to an engine block 22 having a plurality of upstanding mounting pads 22A each formed with a tapped hole 23. The lower side of the cover is adapted to be sealed to the upper side of the block by a resiliently yieldable gasket 24.

A portion of each fastener assembly 20 is adapted to extend through a cylindrical hole 24 (FIG. 2) formed through the rocker arm cover 21 and aligned with one of the tapped holes 23. A counterbore 25 is formed at the upper end of each hole 24.

In general, each fastener assembly 20 includes an elongated threaded fastener 35, a sleeve 36 telescoped over a portion of the fastener and an annular sealing washer or grommet 37 encircling the upper end portion of the sleeve. The fastener includes an elongated shank 40 having a hexagonal driving head 41 and an integral flanged skirt 42 at its upper end. The lower end of the shank is formed with a dog-point tip 43. Immediately above the tip 43, the shank is formed with a threaded portion 45 defined by a helical thread. In this instance, the thread 45 extends over substantially the entire length of the shank 40 although an upper portion of the shank could be unthreaded as disclosed in my aforementioned application.

The sleeve 36 includes a main body portion 48, a radially outwardly extending flange 49 of substantial diameter at the upper end of the body portion, and an outwardly turned flange 50 of smaller diameter at the lower end of the body portion. The washer 37, which is made of plastic or rubber, encircles and grips the upper end portion of the body 48 of the sleeve 36 and engages the bottom of the counterbore 25. The washer serves as a sound barrier and also serves to compensate for tolerance variations in order to control the magnitude of force exerted on the plastic cover 21 when the fastener 35 is tightened. In addition, the washer establishes a fluid-tight seal at the hole 24.

In the installed position of the fastener assembly 20 as shown in FIG. 3, the threaded portion 45 of the fastener 35 is screwed into the tapped hole 23 in the pad 22A of the engine block 22. The sleeve 36 is disposed in the hole 24 in the cover 21 and is located with its lower flange 50 in engagement with the upper side of the pad 22A. The washer 37 and the flange 49 are located in the counterbore 25. When the fastener 35 is tightened, the skirt 42 of the fastener bears against the flange 49 and causes the washer 37 to be pressed into engagement with the bottom of the counterbore 25.

Preparatory to final assembly of the cover 21 with the block 22, all of the fastener assemblies 20 are located in a pre-installed position as shown in FIG. 2. When so positioned, the tip 43 of each fastener 35 is piloted into the upper end of the hole 23 in the pad 22A, the sleeve 36 is located within the hole 24 in the cover 21, and the head 41 of the fastener is spaced a substantial distance above the cover. Automatic drivers (not shown) then engage and rotate the heads in order to screw the threaded sections 45 of the shanks 40 into the holes 23. During such driving, the shank 40 of each fastener moves downwardly within the sleeve 36 until the fastener is fully tightened.

Thus, it is necessary that the fastener 35 be capable of sliding axially within the sleeve 36. It is also desirable that all of the components of the fastener assembly 20 be preassembled after being manufactured so that the assembly may be packaged, shipped and installed as a unitary device. It is, therefore, necessary to captivate the sleeve 36 axially on the fastener 35 so as to hold the two together as a unitary assembly during shipment.

In addition, two other requirements must be met when the fastener assembly 20 is used, for example, for securing a rocker arm cover 21 to an engine block 22. First, it is necessary that the threaded portion 45 of the entire lower end section of the shank 40 be located upwardly within the sleeve 36 when the fastener assembly is in its pre-installation position shown in FIG. 2. This prevents the lower end of the thread from engaging in the tapped hole 23 and allows the cover to lie flat on the block during driving of the fasteners 35. Secondly, once the fastener has been fully driven, it is necessary for the thread to at least extend upwardly to the bottom of the sleeve and preferably extend at least a short distance upwardly into the sleeve so that a full thread is available to provide enhanced strip-out resistance if the fastener is screwed into a thin sheet metal component.

The present invention contemplates a fastener assembly which is capable of satisfying all of the above-mentioned criteria even if the design of the assembly dictates that the axial length of the sleeve 36 be less than one-half the axial length of the shank 40. As a result, the design of the fastener assembly 20 of the present invention lends itself to use both in cases where the sleeve is either short or long in comparison to the length of the shank.

Figure 9:
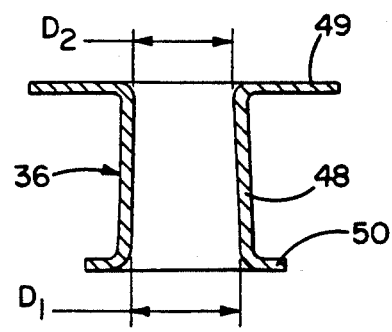
FIG. 9 is an enlarged axial cross-sectional view of the sleeve of the fastener assembly.

To achieve the foregoing, the sleeve 36 is formed such that its inner diameter is greater at the lower end of the sleeve than at the upper end of the sleeve. In the preferred embodiment, this is achieved by forming the body 48 of the sleeve in the shape of a frustum having a relatively large inner diameter $D_1$ (FIG. 9) at its lower end and tapering upwardly to a smaller inner diameter $D_2$ at its upper end. The diameters $D_1$, and $D_2$ are both larger than the major diameter of the thread 45 of the shank 40. As a result, the sleeve 36 (with the washer 37 preassembled thereto) may be slipped onto the shank 40 from the tip end 43 thereof and may slide freely up the shank until the flange 49 engages the skirt 42.

Figure 7:
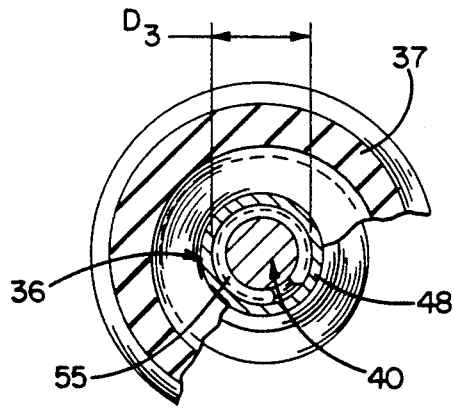
FIG. 7 is an enlarged cross-section taken along the line 7—7 of FIG. 5.
Figure 8:
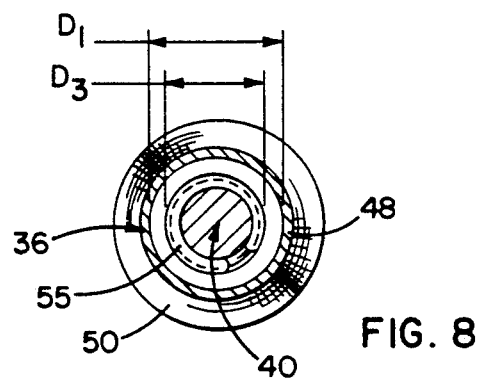
FIG. 8 is an enlarged cross-section taken along the line 8—8 of FIG. 6.

Provision is made of a retainer 55 (FIGS. 4 and 5) for captivating the sleeve 36 axially on the fastener 35. In the preferred embodiment, the retainer is a generally C-shaped clip made out of resiliently yieldable material. Herein, the clip 55 is made of round spring wire and has a relaxed inner diameter somewhat less than the major diameter of the thread 45. The outer diameter $D_3$ (FIGS. 7 and 8) of the clip 55 is smaller than the diameter $D_1$ at the lower end of the sleeve 36 and is larger than the diameter $D_2$ at the upper end of the sleeve.

After the sleeve 36 has been assembled with the fastener 35, the clip 55 is installed on the shank 40 in order to captivate the sleeve against slipping off of the tip end 43 of the shank. In carrying out the invention, the clip 55 is located on the thread 45 between adjacent turns thereof. The clip may be installed by forcibly pushing the clip axially along the threaded portion 45 of the shank as permitted by the resiliency of the clip. Alternatively, the clip may be installed in the manner of a nut by turning the fastener 35 while holding the clip against rotation so as to cause the clip to thread upwardly along the shank 40. It is only necessary to locate the clip sufficiently far up the thread to guard against the clip falling off during shipment of the fastener assembly 20. By way of example, the clip need only be located up the thread about four or five turns from the point where a full diameter thread is achieved at the lower end portion of the shank.

When the clip 55 is in this position, it prevents the sleeve 36 from slipping off of the lower end of the fastener 35 by virtue of the outer diameter of the clip engaging the smaller diameter $D_2$ at the upper end of the sleeve. If a downward axial force of any substantial magnitude is exerted on the sleeve, the small diameter $D_2$ compresses the clip radially inwardly between adjacent turns of the thread 45 and prevents the clip from being pulled downwardly off of the lower end of the shank 40.

Typically, the fastener assemblies 20 are installed in the cover 21 for shipment to the engine assembly plant. During such shipment, the fastener assemblies are held in assembled relation with the cover by virtue of the washers 37 fitting snugly within the counterbores 35.

At the engine assembly plant, the cover 21 is placed downwardly on the engine block 22. As an incident thereto, the end of each fastener 35 engages the underlying pad 22A and causes the fastener to be pushed upwardly into the sleeve 36 sufficiently far to locate the turn of the thread at the extreme lower end of the shank entirely within the sleeve (see FIG. 2). As explained above, this enables the cover 21 to lie flat on the block 22 preparatory to driving the fasteners into the tapped holes 23. During the driving of each fastener, the clip 55 moves downwardly with the fastener until the clip contacts the top of the pad 22A. At this point, the clip remains stationary and the fastener moves relative to the clip as driving of the fastener is completed to fully tighten the fastener.

During removal of the cover 21, the clip 55 moves upwardly with the fastener 35 until the clip is stopped by the reduced diameter section $D_2$ of the sleeve 36. Thereafter, the fastener is simply threaded upwardly through the clip until the entire lower end of the thread 45 is within the sleeve so as to permit removal of the cover. If turning of the fastener then is stopped, the clip will remain attached to the shank.

Figure 6:
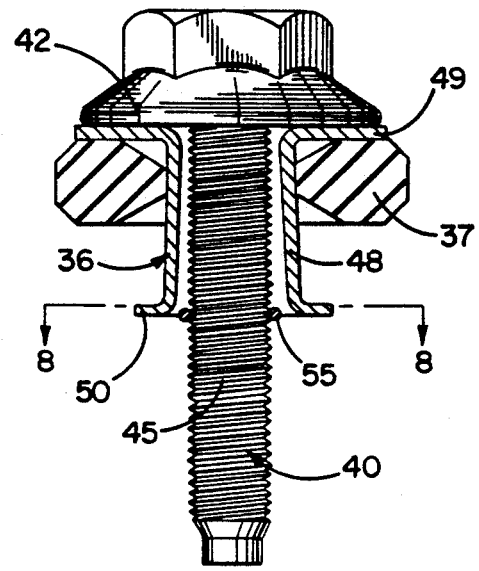

In some instances, the fastener assembly 20 may be used to secure the cover 21 to a thin sheet metal component of the block 22. In such a case, the thread 45 is at least even with the lower flange 50 of the sleeve 36 (see FIG. 6) and thus there is maximum thread contact with the sheet metal component so as to guard against strip-out.

From the foregoing, it will be apparent that the present invention brings to the art a new and improved fastener assembly 20 in which the retaining clip 55 is engaged with the thread 45 of the shank 40 so as to enable the use of a sleeve 36 having a length less than one-half that of the shank while still meeting the specified requirements for a specialized fastener assembly of this type. It should be appreciated that a modified sleeve and modified retainer such as shown in FIGS. 10 and 11, respectively, of my aforementioned application may be used in lieu of the sleeve 36 and the retaining clip 55. Also, the upper end portion of the present sleeve 36 may be formed with a radially inwardly projecting bead as taught in such application and, if desired, an upper portion of the shank 40 may be left unthreaded as long as the threaded lower portion is sufficiently long to enable the upper end of the thread 45 to reach at least to the lower end of the sleeve when the fastener assembly is fully installed.

I claim:

1. A fastener comprising an elongated shank having an upper end with an enlarged driving head and having a lower tip end, said head having a lower side, said shank having a threaded section defined by a helical thread extending along said shank, said thread having upper and lower ends and having a predetermined major diameter, a sleeve having upper and lower ends, the inner diameter of said sleeve adjacent the upper end thereof being less than the inner diameter of said sleeve adjacent the second end thereof and being greater than the major diameter of said thread whereby said sleeve may be slipped onto said shank from the tip end thereof and slipped upwardly along said threaded section to a fully installed position in which the upper end of said sleeve engages the lower side of said head, said sleeve having a pre-installed position in which the upper end of said sleeve is spaced downwardly from the lower side of said head, the lower end of said thread being disposed no lower than the lower end of said sleeve when said sleeve is in said pre-installed position, and a resiliently yieldable retainer extending at least partially around the threaded section of said shank, said retainer fitting between two adjacent turns of said thread when said sleeve is in said pre-installed position and fitting between two different adjacent turns of said thread when said sleeve is in said fully installed position, said retainer being located nearer to the upper end of said thread when said sleeve is in said fully installed position than when said sleeve is in said pre-installed position, said retainer having an inner diameter and an outer diameter, the inner and outer diameters of said retainer being less than and greater than, respectively, the major diameter of said thread, the outer diameter of said retainer being less than the inner diameter of said sleeve adjacent the lower end thereof and greater than the inner diameter of said sleeve adjacent the upper end thereof whereby said sleeve is free to slide back and forth on said shank but is captivated against slipping downwardly off of said shank by virtue of the upper end of said sleeve engaging said retainer, the interior of said sleeve adjacent the upper end thereof being sized and shaped to compress said retainer radially inwardly against said threaded section and thereby prevent said retainer from being pulled downwardly off of said threaded section by a downward axial force exerted on said sleeve.

2. A fastener as defined in claim 1 in which said retainer is a generally C-shaped clip made of resiliently yieldable material.

3. A fastener as defined in claim 2 in which the length of said sleeve is less than one-half the length of said shank.

4. A fastener as defined in claim 1 in which a portion of the inner side of said sleeve defines a frustum which tapers in diameter upon progressing from the lower end of said sleeve toward the upper end thereof.

5. A fastener as defined in claim 4 in which the length of said sleeve is less than one-half the length of said shank.

6. A fastener as defined in claim 1 in which the length of said sleeve is less than one-half the length of said shank.

* * * * *